Aug. 2, 1932. W. S. RUGG 1,870,070
AUTOMOBILE STORAGE BUILDING
Filed March 5, 1930
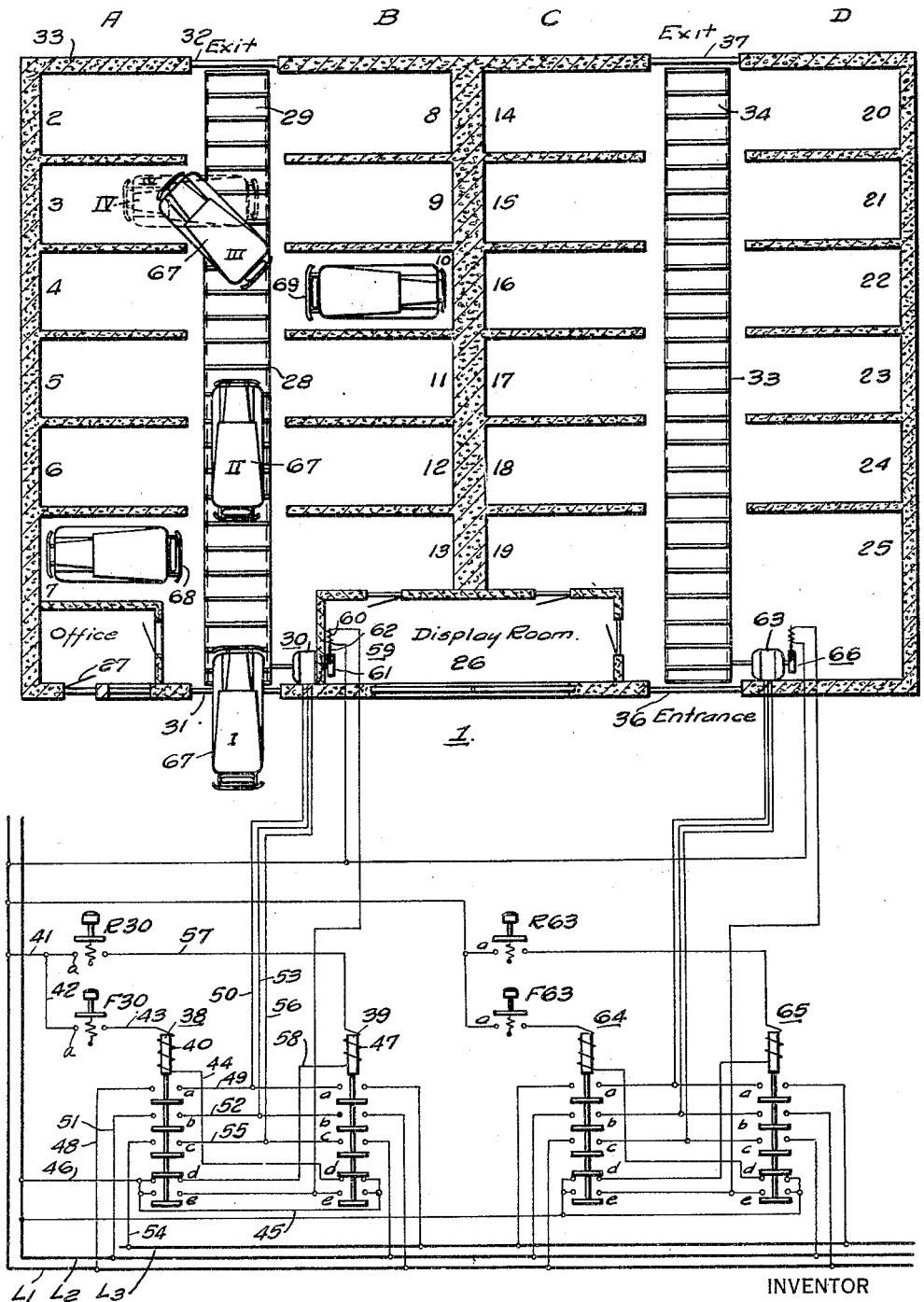
INVENTOR
Walter S. Rugg.
BY
ATTORNEY Patented Aug. 2, 1932

1,870,070

UNITED STATES PATENT OFFICE

WALTER S. RUGG, OF PITTSBURGH, PENNSYLVANIA, ASSIGNOR TO WESTINGHOUSE ELECTRIC & MANUFACTURING COMPANY, A CORPORATION OF PENNSYLVANIA

AUTOMOBILE STORAGE BUILDING

Application filed March 5, 1930. Serial No. 433,300.

My invention relates to automobile storage buildings particularly to automobile storage buildings having endless-belt conveyors ularly, to methods of moving automobiles into storage compartments and, more particularly, to methods of moving automobiles into storage spaces with the aid of conveyor belts located in aisles narrower than the length of any automobile.

In the ordinary type of automobile storage building or garage, automobiles are stored side by side in rows. In this method of storing, the automobile driver must maneuver his automobile back and forth, depending upon the available space between adjacent rows of automobiles, until he is in substantially parallel relation to the longitudinal axis of the storage space into which he intends to move the automobile and store it. Considerable time is wasted in this manner, and there is the accompanying danger of colliding with other automobiles and injuring them in some manner, as by bending fenders or marring and scratching them.

One method which has been suggested for eliminating the hazard of the movement of an automobile into its storage place is to have an endless-belt conveyor, of a width corresponding to the length of the longest automobile that might be placed thereon, positioned in the aisle between the two rows of storage spaces. In this method of storing, an automobile is driven upon the endless conveyor at one end of the building, moved laterally by the conveyor until in alinement with a selected storage space into which it is desired to be moved and then, subsequently, driven into the storage space off the endless belt conveyor, under its own power.

Another suggestion to eliminate the hazard of movement of an automobile into a storage space in an automobile storage building similar to that previously described is to provide a truck or low platform on wheels of a size sufficient to hold the largest standard automobile constructed, which is movable back and forth in the aisle between rows of storage spaces. The automobile is driven directly upon the truck, in a direction parallel to the long axis of the storage spaces, the truck is moved through the aisle until it is in alinement with a vacant storage space, and the automobile is then driven directly from the truck into the storage space.

A modification of the latter suggestion is to provide a turntable truck which permits driving the automobile upon the truck in any direction. The turntable is subsequently rotated until the automobile is substantially parallel to the long axis of the storage spaces, the truck is moved through the aisle until it is in alinement with a vacant storage space, and the automobile is then driven directly from the truck into that space.

All these methods of storing may be simple and practical but they all have the disadvantage of requiring an aisle between adjacent rows of storing spaces which is wider than the length of the longest automobile to be stored. The disadvantage of the wide aisle is, of course, that a considerable percentage of the floor space is required for the movement of the automobiles which serves no useful storage purpose.

My invention enables the construction of an automobile storage building of the type described, in which, however, the aisle between adjacent rows of storage spaces is narrower than the length of any automobile to be stored in the building and thus effects the maximum efficiency of utilization of the floor space or, stated in another way, permits the storing of a greater number of automobiles in the same floor space as that required in previous automobile storage buildings.

It is, therefore, the object of my invention to provide an automobile storage building having a plurality of rows of storage spaces with an aisle between adjacent rows which is narrower than the length of any automobile to be stored in the automobile storage building, whereby a maximum efficiency of utilization of floor space is secured.

Another object of my invention is to provide an endless conveyor in each aisle and a suitable control therefor, for aiding in positioning an automobile at an angle to the aisle whereby it is possible to have an aisle between adjacent rows of storage spaces which is narrower than the length of any automobile to be stored in the building.

Another object of my invention is to disclose a method of turning an automobile at an angle with respect to the aisle between adjacent rows of storage spaces with the aid of an endless conveyor in the aisle.

Other objects will in part be obvious and in part explained in the following specification when taken with the accompanying drawing; wherein, The single figure is a diagrammatic floor-plan view of an automobile storage building, with an endless conveyor in the aisle between adjacent rows of storage spaces, and a suitable electrical control system therefor.

It will be seen that my invention comprises an automobile storage building structure 1 having storage spaces therein disposed in rows designated by reference characters A, B, C and D. Row A comprises a plurality of spaces 2 to 7, inclusive, the row B comprises storage spaces 8 to 13, inclusive, the row C comprises storage spaces 14 to 19, inclusive, and the row D comprises storage spaces 20 to 25, inclusive. The front central part of the building may be utilized as a display room 26, while another may be enclosed to constitute an office 27.

Between the rows A and B, there is an aisle 28 narrower than the length of any automobile to be stored in the building, and an endless conveyor 29 therein, which is of ordinary construction and extends from the front of the building to the back thereof and moves past all the storing spaces in the two rows A and B. This endless conveyor is wide enough to accommodate only the width of an automobile and has its top runway on a level with the surrounding floor, the crevices intervening between the conveyor and the surrounding floor being so small as not to interfere with the movement of an automobile from the conveyor to the floor, or vice versa.

A motor 30 drives the endless-belt conveyor 29. The control system for the driving motor 30 will be subsequently described.

Adjacent to one end of the conveyor 29 is the entrance doorway 31. This doorway may be of any standard construction desired and suitable for the building itself. At the back of the building, adjacent to the opposite end of the conveyor 29 is an exit doorway 32 in the building structure 2, which is similar in construction to the doorway 31.

Between the rows C and D or storing spaces is an aisle 33 of substantially the same dimensions as aisle 28, and has located therein an endless conveyor 34 similar to the endless conveyor 29. A motor 63 drives conveyor 34 in a manner similar to that effected by the motor 30 for the endless conveyor 29. A front entrance doorway 36 in the building structure is located adjacent to one end of the conveyor 34, and a rear exit doorway 37 is located adjacent to the opposite end of the conveyor 34.

The endless conveyor 29 is driven by the motor 30, which may be of standard construction (as, for example, an induction motor of a standard common type) which is controlled by the forward direction push button F30 and the reverse direction push button R30. The push buttons are located in a convenient position near or in the aisle between rows A and B where an attendant can have a good view of all automobiles entering or leaving the storage spaces in those rows. A forward-direction relay 38 is actuated by the push button F30, and a reverse-direction relay 39 is actuated by the reverse-direction push button R30. Actuation of either relay 38 or relay 39 supplies current to the motor to cause the motor to rotate in the one or the other direction.

The closing of the contact members $a$ of the push-button switch F30 closes the energizing circuit through the coil 40 of the relay 38 as follows: from line conductor L1, through conductors 41 and 42, contact members $a$ of the push-button switch F30, conductor 43, coil 40 of the relay 38, conductor 44, and interlock contact members $d$ on the relay 39, conductors 45 and 46 to line conductor L2. Contact members $d$ of the relay 39, being normally closed for the deenergized position of that relay, permit the closing of the circuit through coil 40. However, should the contact members $d$ of relay 39 be open, as they are when the coil 47 of reversing relay 39 is energized, the circuit through the coil 40 cannot be completed, and, therefore, the relay 38 cannot operate if the relay 39 is already energized. Contact member $d$ of relay 38 performs a similar function for coil 47 of relay 39 and thus relays 38 and 39 are so interlocked that neither can be operated once the other has been energized. The energization of coil 40 of relay 38 closes the normally open contact members $a$, $b$, $c$ and $e$ of that relay and opens normally closed contact members $d$ of that relay. The motor 30 is thus connected to the three-phase supply lines L1, L2 and L3 as follows:

The circuit to one phase winding of the motor 30 extends from the line conductor L1, through conductor 48, contact members $d$ of the relay 38 and conductors 49 and 50, to one of the terminals of the motor 30.

The circuit to another phase of the motor 30 extends from line conductor L2, through conductor 51, contact members $b$ of the relay 38, conductors 52 and 53, to another terminal of the motor 30.

The circuit to the third phase of the motor 30 extends from line conductor L3, through conductor 54, contact members $c$ of the relay 38, conductors 55 and 56, to the terminal of the third phase of the motor 30.

As long as the push-button switch F30 is held in, the motor 30 will continue to rotate and move the endless conveyor 29 in a forward direction, that is, a direction toward the exit 32. It will be thus understood that a very small movement of the endless conveyor 29 is obtainable by momentarily closing the push-button switch F30, whereby a so-called "inching" movement is obtained.

When it is desired to effect a reverse movement of the endless conveyor 29, that is, a movement of the conveyor toward the entrance 31, the reversing push-button switch R30 is pressed. Assuming that relay 38 is deenergized, the closing of the push-button switch R30 closes the energizing circuit through the coil 47 of the relay 39 as follows: from line conductor L1, through conductor 41, contact members *a* of the reversing push-button switch R30, conductor 57, coil 47 of the relay 39, conductor 58, contact members *d* of the relay 38 and conductor 46, to the line conductor L2.

Relay 39, when energized, closes its normally open contact members *a*, *b* and *c* to supply current from the supply lines to the motor 30, with the phase connections of two of the phase windings of the motor reversed.

In order to effect an almost instantaneous stopping of the movement of the motor 30 and, therefore, of the conveyor 29, this being necessary to prevent collision of an automobile with the side of the storage space into which it has been partially moved, a magnetic brake 59 is associated with the shaft of the motor 30, and is automatically set on release of the push-button switches F30 and R30. The magnetic brake is of a common type which is normally retained in a braking position by a spring (not shown) and is released from the braking position against the force of the spring by a magnet 60 which is energized upon actuation of either of the push-button switches R30 or F30, in a manner to be later described. This brake comprises essentially a drum 61 suitably attached to the shaft of motor 30 and a brake shoe 62 engaging it and held in a braking position by a spring (not shown). A magnet coil 60 is suitably mounted, with respect to the brake shoe 62, so that, when the magnet coil 60 is energized, the shoe 62 is moved away from the drum 61. The magnet coil 60 is energized through contact members *e* of either of the relays 38 and 39 which close when their relays are energized. Therefore, when either of these relays is energized, the brake is released, and when these relays are deenergized, the brake is set.

Thus, the use of this brake insures the immediate stopping of the endless conveyor 29 upon the release of either of the push buttons F30 and R30.

The motor 63 for the endless conveyor 34 is controlled by a forward-direction relay 64 and reverse-direction relay 65 actuated, respectively, by push-button switches F63 and R63 in a manner like that described for the motor 30 and its associated control system and, therefore, the control for motor 63 will not be described herein. The push-button switches F63 and R63 are located in a convenient position near or in the aisle between rows C and D so that an attendant has a good view of all automobiles entering or leaving the storage spaces in those rows.

A magnetic brake 66 similar to that described for motor 30 is provided for motor 63.

In order to further understand the operation of my invention, let it be assumed that an automobile 67 is entering the building structure through the entrance 31. The automobile is represented at four different stages of the storing operation, designated by Roman numerals I, II, III and IV, respectively. The Roman numeral one (I) indicates the first position of an automobile in its movement to a particular storage space, here assumed to be storage space 3. The automobile subsequently moves, under its own power, parallel to the longitudinal axis of the conveyor 29, the conveyor being stationary at the time. A second position, such as subsequently occurs, is indicated by that designated by the Roman numeral two (II). The automobile continues moving in a direction parallel to the longitudinal axis of the endless conveyor 29 until it reaches the entrance to storage space 3. The aisle 28 between the rows A and B is so narrow that it is impossible for the driver to drive directly into the storage space 3 without maneuvering back and forth. At best, he can only position the automobile in an angular position with respect to the longitudinal axis of the storing space 3. This position is indicated by the Roman numeral three (III). The driver of the automobile stops it in position III and leaves the emergency brake off. An attendant then presses the forward-direction push-button switch F30, which causes the endless conveyor 29 to move slowly in a forward direction, that is, in a direction toward the rear exit 32, as long as the push button F30 is depressed. When the attendant sees that the rear end of the automobile has been swung through an arc sufficient to place the automobile in the position indicated by Roman numeral four (IV), in which position the longitudinal axis of the automobile is in a substantially parallel relation to the longitudinal axis of the storage space 3, he stops the conveyor by releasing the push button F30. The driver then subsequently drives the automobile directly into the storage space 3 and stops it in a proper position therein.

Automobiles in their stored position are indicated by the automobiles 68 and 69.

In removing an automobile from storage, the reverse order of operation is effected, that is, the driver backs the automobile out of the storing space 3 until the rear wheels are on the endless conveyor 29, and the automobile is in a position corresponding to that indicated by Roman numeral IV and stops it, leaving the emergency brake off. The attendant then pushes the reversing push-button switch R30, which causes the endless conveyor 29 to move in a reverse direction, that is, in a direction toward the entrance 31. When the automobile reaches the position indicated by Roman numeral III, the attendant releases the push button 29, and the conveyor stops. The driver then backs the automobile through an arc until the longitudinal axis of the automobile is in a substantially parallel relation to the longitudinal axis of the endless conveyor 29, in a position similar to that indicated by the Roman numeral II. The automobile is then in such position that the driver can drive the automobile directly out of the building through the exit 32.

All of the storage spaces 2 to 13, inclusive, are similarly filled and vacated with automobiles.

The storing spaces 14 to 25, inclusive, are filled and vacated by automobiles assisted to their proper storage spaces by the use of the endless conveyor 34, in a manner similar to that described for the endless conveyor 29.

It will thus be seen that my invention comprises an automobile storage building having a plurality of adjacent rows of storage spaces with an aisle narrower than the length of any automobile to be stored in the building disposed between adjacent rows of storing spaces, each aisle having a conveyor therein, of a width sufficient to accommodate only the width of an automobile, the conveyor adapted to assist an automobile into the storage spaces by swinging one end of it through an arc. It is understood that the structure of my invention may be modified without avoiding the spirit of my invention, and I, therefore, wish to be limited to the details shown herein only so far as is defined by the appended claims.

I claim as my invention:

1. In an automobile storage structure, an aisle having a width less than the length of any automobile to be stored in the structure, a plurality of automobile storage spaces opening thereinto, endless conveyor means in said aisle for engaging and moving only one end of an automobile through an arc to position the automobile at an angle to the direction of movement of said endless conveyor means, whereby an automobile may be driven into any of the said storage spaces.

2. In an automobile storage structure, an aisle having a width less than the length of any automobile to be stored in the structure, a plurality of automobile storage spaces opening thereinto, endless conveyor means in said aisle movable in either of two opposite directions past all of said storage spaces for engaging and moving only one end of an automobile through an arc to position the automobile at an angle to the direction of movement of said endless conveyor means, whereby an automobile may be driven into and out of any of the said storage spaces.

3. In an automobile storage structure, an aisle having a width less than the length of any automobile to be stored in the structure, a plurality of automobile storage spaces opening thereinto, endless conveyor means in said aisle movable in either of two opposite directions past all of said storage spaces for engaging and moving only one end of an automobile through an arc to position the automobile at an angle to the direction of movement of said endless conveyor means, whereby an automobile may be driven into and out of any of the said storage spaces, motive means for said endless conveyor means, and control means for said motive means.

In testimony whereof, I have hereunto subscribed my name this 26th day of February, 1930.

WALTER S. RUGG.